US00RE47418E

(19) United States
(12) Reissued Patent
DeRosa et al.

(10) Patent Number: US RE47,418 E
(45) Date of Reissued Patent: Jun. 4, 2019

(54) OPTICAL CONNECTORS WITH INORGANIC ADHESIVES AND METHODS FOR MAKING THE SAME

(71) Applicant: Corning Optical Communications LLC, Hickory, NC (US)

(72) Inventors: Michael Edward DeRosa, Painted Post, NY (US); Shawn Michael O'Malley, Horseheads, NY (US); Vitor Marino Schneider, Painted Post, NY (US)

(73) Assignee: Corning Optical Communications LLC, Hickory, NC (US)

(21) Appl. No.: 15/651,267

(22) Filed: Jul. 17, 2017

Related U.S. Patent Documents

Reissue of:
(64) Patent No.: 9,086,548
Issued: Jul. 21, 2015
Appl. No.: 14/041,506
Filed: Sep. 30, 2013

(51) Int. Cl.

| | |
|---|---|
| ***G02B 6/36*** | (2006.01) |
| ***C09J 5/00*** | (2006.01) |
| ***B32B 37/14*** | (2006.01) |
| ***G02B 6/38*** | (2006.01) |
| ***C09J 1/00*** | (2006.01) |

(52) U.S. Cl.
CPC ..... *G02B 6/3861* (2013.01); *B32B 37/142* (2013.01); *C09J 1/00* (2013.01); *G02B 6/3854* (2013.01); *C09J 5/00* (2013.01); *C09J 2400/12* (2013.01); *G02B 6/3863* (2013.01); *G02B 6/3865* (2013.01); *G02B 6/3885* (2013.01); *G02B 6/3887* (2013.01)

(58) Field of Classification Search
CPC . C09J 1/00; C09J 5/00; C09J 2400/12; G02B 6/3861; G02B 6/3854; G02B 6/3865; G02B 6/3887; G02B 6/3885; G02B 6/3863; B32B 37/142
See application file for complete search history.

(56) References Cited

U.S. PATENT DOCUMENTS 3,910,857 A * 10/1975 Phillips ..... C08K 3/22 523/458
4,755,018 A 7/1988 Heng et al.
4,923,274 A 5/1990 Dean
4,931,120 A 6/1990 Christoff
(Continued)

FOREIGN PATENT DOCUMENTS

EP 0376537 A2 7/1990

OTHER PUBLICATIONS

Dietz, R. L., "Optical fiber sealing withs older glass: Design Guidelines, "Proceedings of SPIE, 2004, vol. 5578, pp. 642-651.*
(Continued)

*Primary Examiner* — Deandra M Hughes
(74) *Attorney, Agent, or Firm* — Adam R. Weeks

(57) ABSTRACT

One embodiment of the disclosure relates to an optical connector. The optical connector may include a ferrule, a waveguide, and an inorganic adhesive composition. The ferrule may include a fiber-receiving passage defining an inner surface. The inorganic adhesive composition may be disposed within the ferrule and in contact with the inner surface of the ferrule and the waveguide. The inorganic adhesive composition may include at least about 50% by weight of metal oxide.

53 Claims, 1 Drawing Sheet

(56) References Cited

U.S. PATENT DOCUMENTS

| | | | | |
|---|---|---|---|---|
| 4,984,865 | A * | 1/1991 | Lee | G02B 6/3861 156/322 |
| 5,040,867 | A | 8/1991 | De Jong et al. | |
| 5,363,461 | A | 11/1994 | Bergmann | |
| 5,394,496 | A | 2/1995 | Caldwell et al. | |
| 5,499,310 | A | 3/1996 | Ueda | |
| 5,500,917 | A * | 3/1996 | Daniel | C03C 27/06 385/43 |
| 5,991,493 | A | 11/1999 | Dawes et al. | |
| 6,173,097 | B1 | 1/2001 | Throckmorton et al. | |
| 6,379,054 | B2 | 4/2002 | Throckmorton et al. | |
| 6,435,731 | B1 * | 8/2002 | Yamaguchi | G02B 6/3855 385/60 |
| 6,439,780 | B1 | 8/2002 | Mudd et al. | |
| 6,488,414 | B1 * | 12/2002 | Dawes | G02B 6/241 385/141 |
| 6,546,030 | B2 * | 4/2003 | Sasao | H01S 5/0226 372/34 |
| 6,584,259 | B2 | 6/2003 | Rubino, Jr. | 385/115 |
| 6,757,464 | B2 | 6/2004 | Rubino, Jr. | 385/52 |
| 6,816,661 | B1 | 11/2004 | Barnes et al. | |
| 6,820,445 | B2 | 11/2004 | Gratrix | |
| 7,918,612 | B1 | 4/2011 | Zhao et al. | |
| 8,985,866 | B2 | 3/2015 | Danley et al. | |
| 8,989,541 | B2 * | 3/2015 | Zimmel | G02B 6/3861 385/100 |
| 9,086,548 | B2 | 7/2015 | DeRosa et al. | |
| 9,409,814 | B2 * | 8/2016 | Takayama | H01M 8/0282 |
| 9,588,303 | B2 | 3/2017 | Danley et al. | |
| 2002/0037142 | A1 * | 3/2002 | Rossi | G02B 6/4204 385/92 |
| 2002/0074086 | A1 | 6/2002 | Nakamura et al. | |
| 2002/0186954 | A1 | 12/2002 | Liu et al. | |
| 2003/0116273 | A1 | 6/2003 | Nakamura et al. | |
| 2006/0035087 | A1 * | 2/2006 | Yadav et al. | 428/411.1 |
| 2006/0083469 | A1 | 4/2006 | Faid et al. | |
| 2007/0282081 | A1 * | 12/2007 | Ichiroku | 525/523 |
| 2008/0299288 | A1 * | 12/2008 | Kobrin et al. | 427/2.1 |
| 2009/0320605 | A1 * | 12/2009 | Antila | C04B 37/005 73/718 |
| 2010/0120960 | A1 * | 5/2010 | Lee et al. | B22F 1/0022 524/403 |
| 2010/0288422 | A1 | 11/2010 | Krauss et al. | 156/105 |
| 2013/0089294 | A1 * | 4/2013 | Zimmel | 385/80 |
| 2013/0309613 | A1 | 11/2013 | O'Malley et al. | 430/319 |
| 2013/0313301 | A1 | 11/2013 | Brown et al. | 225/2 |
| 2014/0010493 | A1 * | 1/2014 | Kondo et al. | 385/2 |
| 2015/0093080 | A1 | 4/2015 | DeRosa et al. | |

OTHER PUBLICATIONS

Accuratus, "Zirconium Oxide, ZrO2. Ceramic Properities," XP-002711172, Retrieved on Aug. 8, 2013 from http://accuratus.com/zire.html. 1 page.*

Conzone, S.D., et al., "Low temperature joining of Zerodur and SiO2 for optical device manufacture," Proceedings of SPIE: Inorganic Optical Materials III, vol. 4452, 2001, pp. 107.

Gvishi, R., et al., "UV-curable glassy material for the manufacture of bulk and nano-structured elements," Journal of the European Optical Society, Rapid Publications, vol. 7, Mar. 22, 2012, 5 pages.

Luvalle, M., et al., "Acceptance Testing for the Pistoning Failure Mode in Fiber Optic Connectors," Proceedings of SPIE: Optical Fiber and Component Mechanical Reliability and Testing, vol. 4215, 2001, pp. 168-182.

Park, J., et al., "Critical Aspect of Curing Epoxy Adhesive: Fiber Pistoning of LC Connector," IEEE Transactions on Device and Materials Reliability, vol. 5, Issue 3, 2005, pp. 572-580.

Non-Final Office Action for U.S. Appl. No. 14/041,506, dated Feb. 10, 2015, 11 pages.

Notice of Allowance for U.S. Appl. No. 14/041,506, dated May 7, 2015, 8 pages.

* cited by examiner

OPTICAL CONNECTORS WITH INORGANIC ADHESIVES AND METHODS FOR MAKING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The disclosure relates generally to materials and methods for adhering parts within optical connectors and more particularly to adhesive compositions for use in adhering optical fibers to ferrules within optical connectors, and the methods making the same.

No admission is made that any reference cited herein constitutes prior art. Applicants expressly reserve the right to challenge the accuracy and pertinency of any cited documents.

SUMMARY

One embodiment of the disclosure relates to an optical connector. The optical connector may comprise a ferrule, a waveguide (such as an optical fiber, lens, or other structure configured to guide light), and an inorganic adhesive composition. The ferrule may comprise a fiber-receiving passage defining an inner surface. The inorganic adhesive composition may be disposed within the ferrule and in contact with the inner surface of the ferrule and the waveguide. The inorganic adhesive composition may comprise at least about 50% by weight of metal oxide.

An additional embodiment of the disclosure relates to a method for securing a waveguide to a ferrule of an optical connector. The method may comprise depositing an inorganic adhesive composition precursor onto the waveguide or into a fiber-receiving passage defining an inner surface of the ferrule. The method may also comprise inserting the waveguide into the fiber-receiving passage, such that the inorganic adhesive composition precursor is disposed within the ferrule and in contact with the inner surface of the ferrule. The method may also comprise solidifying the inorganic adhesive composition precursor to form an inorganic adhesive composition. The inorganic adhesive composition may comprise at least about 50% by weight of metal oxide.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description illustrate the concepts of the present disclosure with reference to specific examples, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
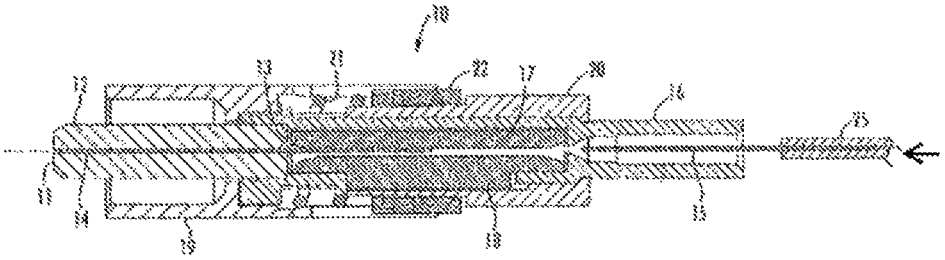
FIG. 1 is a lengthwise cross-sectional view of a fiber optic mechanical splice connector to be mounted on an end portion of a field optical fiber.

Reference will now be made in greater detail to various embodiments, some embodiments of which are illustrated in the accompanying drawings. Whenever possible, the same reference numerals will be used throughout the drawings to refer to the same or similar parts. Generally, disclosed herein are various embodiments of inorganic adhesive compositions for use in adhering optical fibers or other waveguides to ferrules within optical connectors, and the methods for use thereof. The various embodiments of inorganic adhesive compositions described herein may provide desirable properties, such as, but not limited to, high adhesion strength and/or improved performance following environmental aging. Various embodiments of the inorganic adhesive compositions disclosed herein may also have other desirable properties for the process of securing an optical fiber within a ferrule, such as, but not limited to, shortened process cycle time, no required mixing, and/or no potlife issues.

Figure 3:
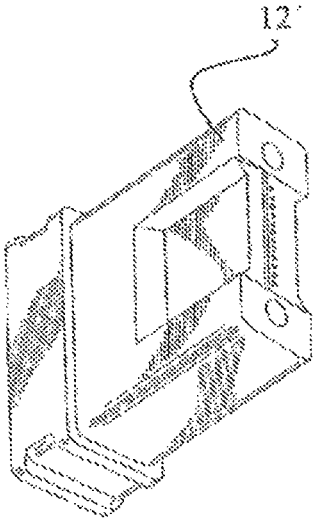
FIG. 3 is a perspective view of a ferrule according to another embodiment.
Figure 4:
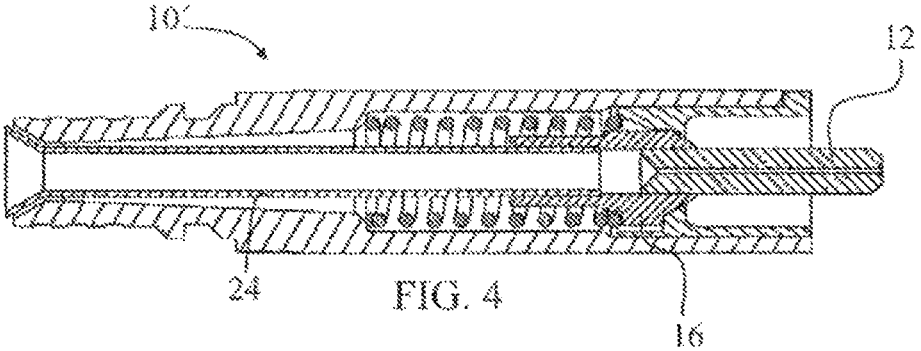
FIG. 4 is a lengthwise cross-sectional view of a connector according to another embodiment.

Referring to FIG. 1, a field-installable, mechanical splice fiber optic connector 10 suitable for use with the present technology is shown. The fiber optic connector 10 may include features similar to those of a member of the UNICAM® family of mechanical splice connectors available from Corning Cable Systems, LLC of Hickory, N.C., USA. While one embodiment of a fiber optic connector is depicted in FIG. 1, it should be understood that the inorganic adhesive compositions and methods for adhering a glass fiber to a ferrule as described herein are applicable to any fiber optic connector of any design. Such fiber optic connectors include, but are not limited to, single-fiber (see, e.g., ferrule 12 of connectors 10, 10' as shown in FIGS. 1 and 4) or multi-fiber (see, e.g., ferrule 12' as shown in FIG. 3) connectors, such as fusion splice or mechanical splice connectors. Examples of typical single fiber mechanical splice connectors are provided in U.S. Pat. Nos. 4,755,018; 4,923,274; 5,040,867; and 5,394,496. Examples of typical multi-fiber mechanical splice connectors are provided in U.S. Pat. Nos. 6,173,097; 6,379,054; 6,439,780; and 6,816,661.

Figure 2:
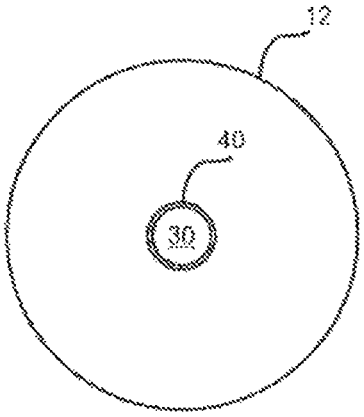
FIG. 2 illustrates a fiber-receiving passage of a connector ferrule.

As is illustrated with [further] reference to FIG. 2, the mechanical splice connector 10 includes a connector ferrule 12 defining a lengthwise, longitudinal bore, referred to herein as a fiber-receiving passage 30. The fiber-receiving passage 30, which is illustrated in exaggerated scale in FIG. 2, defines an inner surface of the ferrule 12, which may be contacted with an inorganic adhesive composition 40 to secure an optical fiber, such as a stub optical fiber 14. The inorganic adhesive composition 40 may be disposed within the ferrule 12 and in contact with the inner surface of the ferrule 12 and the stub optical fiber 14. Various embodiments of the inorganic adhesive composition 40, including variations of inorganic adhesive compositions are described in detail herein. In various embodiments, the inorganic adhesive composition 40 may generally comprise a ceramic material, as is described in detail herein.

The ferrule 12 may comprise a ceramic material, such as, but not limited to, zirconia, yttria-stabilized zirconia (YSZ), alumina, titanium-doped alumina, glass-filled PPS, or combinations thereof. However, other materials of construction of the ferrule are contemplated herein, such as metals, ceramics, polymers, or combinations thereof.

The stub optical fiber 14 may be a flexible, transparent optical fiber made of glass or plastic. It may function as a waveguide to transmit light between the two ends of the optical fiber. Optical fibers typically include a transparent core surrounded by a transparent cladding material with a lower index of refraction. Light may be kept in the core by total internal reflection. Glass optical fibers may comprise silica, but some other materials, such as fluorozirconate, fluoroaluminate, and chalcogenide glasses, as well as crystalline materials, such as sapphire, may be used. Although shown as the stub fiber 14 in FIG. 1, in other embodiments waveguides that are not stub fibers may be included and used in combination with the ferrule 12, 12' and processes disclosed herein. This includes not only optical fibers that are not stub optical fibers, but also other waveguides such as lenses (e.g., gradient index lenses).

The light may be guided down the core of the optical fiber 14 by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber 14 during the drawing process. The coatings may protect the strands of glass fiber. The optical fiber 14 may comprise an inner primary coating, and an outer secondary coating. Optical fiber coatings may be applied in concentric layers.

Still referring to FIG. 1, the forward end (also referred to herein as the end face) 11 of the ferrule 12 is typically precision polished such that the stub optical fiber 14 is flush with (as shown) or slightly protruding from the end face of the ferrule 12. However, the stub optical fiber 14 may also protrude outwardly from the end face 11 of the ferrule 12 a predetermined distance, if desired. Furthermore, the end face 11 may be oriented generally perpendicular to the optical fiber receiving passage to provide an Ultra Physical Contact (UPC) type connector, or may be formed at a predetermined angle to provide an Angled Physical Contact (APC) type connector, in a known manner. In addition, although a single fiber ferrule 12 is shown for purposes of convenience, the ferrule 12 may define a plurality of lengthwise-optical fiber receiving passages therethrough for receiving a corresponding plurality of stub optical fibers to provide a multi-fiber mechanical splice connector or other multi-fiber connector (see generally multi-fiber ferrule 12' as shown in FIG. 3 for a multi-fiber connector).

Generally, the rear end 13 of the ferrule 12 is inserted into and secured within the forward end of a ferrule holder 16 so that the stub optical fiber 14 extends rearwardly a predetermined distance from the ferrule between a pair of opposed splice components 17, 18, disposed within the ferrule holder. In turn, the ferrule holder 16, including the ferrule 12 and splice components 17, 18 is disposed within a connector housing 19. A cam member 20 is movably mounted between the ferrule holder 16 and the connector housing 19 for engaging a keel portion of the lower splice component 18, as will be described. If desired, the ferrule 12, the ferrule holder 16 and the cam member 20 may be biased relative to the connector housing 19, for example by a coil spring 21, to ensure physical contact between the end face 11 of the ferrule 12 and the end face of an opposing ferrule in a mating fiber optic connector or optical device. Finally, a spring retainer 22 may be disposed between the connector housing 19 and a medial portion of the cam member 20 and fixed to the connector housing so as to retain one end of the spring 21 relative to the connector housing. As a result, the ferrule 12, the ferrule holder 16 and the cam member 20 are biased forwardly, yet permitted to piston rearwardly relative to the connector housing 19.

As illustrated by the horizontal directional arrow in FIG. 1, a field optical fiber 15 may be inserted into the rear end of the ferrule holder 16 opposite the ferrule 12 and the stub optical fiber 14. Although not required, the mechanical splice connector 10 may be provided with a means, for example a lead-in tube 24 (FIG. 4), for guiding the field optical fiber 15 into the ferrule holder 16 and between the splice components 17, 18 in general alignment with the stub optical fiber 14. In some embodiments, at least one of the splice components 17, 18 has a groove formed therein for receiving the stub optical fiber 14 and the field optical fiber 15. As shown [herein] *in FIG. 1*, the lower splice component 18 is provided with a lengthwise V-shaped groove for receiving and guiding the stub optical fiber 14 and the field optical fiber 15 into fine alignment. Typically, the field optical fiber 15 is coated or tight-buffered with a buffer 25 that is stripped back to expose a predetermined length of the end of the field optical fiber. The mechanical splice connector 10 may be further provided with a crimp tube or other strain relief mechanism (not shown) for retaining and strain relieving the buffer 25 of the field optical fiber 15. With the buffer 25 removed, the field optical fiber 15 can be inserted and advanced into the rear of the mechanical splice connector 10 between the splice components 17, 18 until the end portion of the field optical fiber 15 makes physical contact with the end portion of the stub optical fiber 14. The cam member 20 is actuated by moving or rotating the cam member 20 relative to the ferrule holder 16 about the longitudinal axis of the connector 10, to engage the keel on the *lower* splice component 18 and thereby force the lower splice component 18 in the direction of the upper splice component 17. Movement of the lower splice component 18 causes the end portion of the stub optical fiber 14 and the end portion of the field optical fiber 15 to seat within the V-shaped groove formed in the lower splice component 18, thereby aligning and simultaneously securing the field optical fiber 15 relative to the stub optical fiber 14 between the splice components. Accordingly, the field optical fiber 15 is optically coupled to the stub optical fiber 14. Further, as used herein, the portion of the connector where the optical coupling results is referred to as a "termination area." In other embodiments, the field optical fiber 15 or another optical fiber may be inserted into the ferrule directly, and attached thereto as disclosed herein, in place of the stub fiber 14.

Generally, it should be understood that the inorganic adhesive compositions described herein may have application in adhering an optical fiber with any part of an optical connector, and are not limited to the adhesion of a stub optical fiber to the inner wall of [the] *a* ferrule. For example, the inorganic adhesive compositions described herein may be used to bond any part of an optical connector to any optical fiber connected thereto, including the stub optical fiber and field optical fiber.

Various embodiments of inorganic adhesive compositions will now be disclosed herein. As used herein, an "adhesive" is a substance capable of holding materials together by surface attachment. Additionally, as used herein, an "inorganic adhesive composition" or "inorganic adhesive composition precursor" is an adhesive or precursor to an adhesive, respectively, which contains inorganic materials, usually a majority by weight of inorganic materials, such as metal oxides, other inorganic additives, or both. Inorganic adhesive compositions, as described herein, may contain some amount of organic material, such as organic adhesion promoters. However, in one embodiment, the inorganic adhesive composition may generally comprise a ceramic material. In some embodiments, the inorganic adhesive composition may comprise one or more metal oxides such as, but not limited to, oxides of zinc, tin, aluminum, indium, iron, tungsten, titanium, zirconium, silicon, silicon nitride, boron, boron nitride, copper, silver, yttrium, rare earth ions, or combinations thereof. The inorganic adhesive may comprise one or more metal oxides doped with one or more other metal oxides, such as yttria-stabilized zirconia, sometimes referred to herein as "YSZ." In some embodiments, the inorganic adhesive composition may be substantially the same material as the ferrule. For example, the ferrule may comprise a ceramic material, such as zirconia or YSZ, and the inorganic adhesive may comprise zirconia or YSZ.

The stub optical fiber may be secured to a ferrule of an optical connector by a method generally comprising depositing an inorganic adhesive composition precursor onto the stub optical fiber or into a fiber-receiving passage defining an inner surface of the ferrule, inserting the stub optical fiber into the fiber-receiving passage, such that the inorganic adhesive composition precursor is disposed within the ferrule and in contact with the inner surface of the ferrule, and solidifying the inorganic adhesive composition precursor to form an inorganic adhesive composition. In some embodiments, the solidification process may sufficiently sinter the inorganic adhesive composition precursor.

The inorganic adhesive composition precursor may comprise a metallic salt or other metal ion containing compound in a solvent. The metallic salt and/or other metal ion containing compound may comprise ions of zinc, tin, aluminum, indium, iron, tungsten, titanium, zirconium, silicon, silicon nitride, boron, boron nitride, copper, silver, yttrium, rare earth ions, or combinations thereof. In one embodiment, the metallic salt and/or other metal ion containing compound may comprise ions of zirconium, yttrium, or both.

In some embodiments, the solvent may be a polar aprotic solvent. The polar aprotic solvents described herein have ion solvating properties that facilitate the process of making a stable inorganic adhesive composition precursor. The inorganic adhesive composition precursor may be a sol-gel solution. The sol-gel described herein may be different from traditional sol-gel chemistry in several important ways. For example, the proposed material reaction to form the sol-gel solution may not use alcohol solvents or conventional water/acid catalysis. Instead, the reaction may utilize metal salt concentrations in polar aprotic solvents (e.g. DMF, NMP) at relative high concentration (0.5-2.0 M).

Polar aprotic solvents such as, for example, dimethylformamide (DMF) and n-methyl pyrrolidone (NMP), can be used to produce stable precursor solutions with metal salts and/or other metal ion containing compounds. Polar aprotic solvents may be described as solvents that share ion dissolving power with protic solvents but lack an acidic hydrogen. These solvents generally have intermediate dielectric constants and polarity. Aprotic solvents do not commonly display hydrogen bonding or have an acidic hydrogen. They are commonly able to stabilize ions. Table 1 shows a description and selected properties of some suitable polar aprotic solvents.

TABLE 1

| | | |
|---|---|---|
| Dichloromethane (DCM) | $CH_2Cl_2$ | 1.3266 g/ml |
| Tetrahydrofuran (THF) | /—$CH_2$—$CH_2$—O—$CH_2$—$CH_2$—\ | 0.886 g/ml |
| Ethyl acetate | $CH_3$—C(═O)—O—$CH_2$—$CH_3$ | 0.894 g/ml |
| Acetate | $CH_3$—C(═O)—$CH_3$ | 0.786 g/ml |
| Dimethylformamide (DMF) | H—C(═O)N$(CH_3)_2$ | 0.944 g/ml |
| Acetonitrile (MeCN) | $CH_3$—C≡N | 0.786 g/ml |
| Dimethylsulfozide (DMSO) | $CH_3$—S(═O)—$CH_3$ | 1.092 g/ml |

Various metal oxides can be included in the inorganic adhesive composition based on the components of the inorganic adhesive composition precursor. For example, an inorganic adhesive composition comprising YSZ can be prepared by utilizing [and] *an* inorganic adhesive composition precursor. Such an inorganic adhesive composition precursor may be prepared by mixing a first zirconia containing metal salt solution and a second yttria containing salt solution. The first solution may include zirconium oxychloride octohydrate ($Zr(OCl_2).8H_2O$, >99% from Sigma-Aldrich) dissolved in N,N-dimethylformamide (DMF). The second solution may include Yttrium Chloride ($YCl_3$ from Sigma Aldrich) dissolved in N,N-dimethylformamide (DMF). The first and second solutions may be prepared with molar concentrations having stoichiometry to achieve a ratio between the atom % values of Zirconia and Yttrium. For example, samples may contain 1%, 2%, 4% and 8% atom content of Yttrium in Zirconia. An ultrasonic bath may be used to facilitate mixing. The inorganic adhesive composition precursor may be clear and of significant viscosity.

An advantage of the inorganic adhesive compositions disclosed herein is the stability of the inorganic adhesive composition precursor. The inorganic adhesive composition precursor can be stored in ambient conditions for at least a month without significant degradation of the sol-gel chemical structure of the metal ions or the solvent.

The inorganic adhesive composition precursor is converted into the inorganic adhesive composition through a solidification step. The solidification may comprise exposing the inorganic adhesive composition precursor to a temperature in a range of from about 200° C. to about 1200° C. In other embodiments, the solidification may comprise exposing the inorganic adhesive composition precursor to a temperature in a range of from about 250° C. to about 1100° C., from about 300° C. to about 800° C., or from about 300° C. to about 600° C. During the solidification, the solvent may be liberated from the inorganic adhesive composition precursor and at least some of the components of inorganic adhesive composition precursor may be sintered.

The heating may be by oven, hot plate, or any other suitable heating mechanism. In some embodiments[. Other], *other* heating mechanisms such as microwave and inductive heating may be used. Time and temperature of such heating processes may vary depending upon the heating mechanism utilized in the solidification step. In one embodiment, the inorganic adhesive composition precursor may be heated with a laser. For example, a laser having a 40 W power rating at 810 nm focused on a spot size of approximately 2 mm may be used. However, the use of various laser powers, wavelengths, and surface areas is contemplated herein. The heating step may take less than about 3 minutes, less than about 2 minutes, less than about 1 minute, less than about 45 seconds, less than about 30 seconds, less than about 20 seconds, less than about 15 seconds, less than about 10 seconds, or even less than about 5 seconds. However, the time may be dependent upon the power of the laser and the contacting surface of the laser. The adhesive composition may then be allowed to cool by any process, such as by accelerated cooling or through cooling in an ambient atmosphere at or near room temperature.

Following the solidification step, the inorganic adhesive composition may be crystallized. The crystallization may be caused by an exposure to a temperature in a range of from about 200° C. to about 1200° C. In other embodiments, the crystallization may comprise exposing the inorganic adhesive composition [precursor] to a temperature in a range of from about 250° C. to about 1100° C., from about 300 ° C. to about 800 ° C., or from about 300° C. to about 600° C. The crystallization step may utilize heating in an Argon atmosphere inside a glove box. In some embodiments, the inorganic adhesive composition may be partially or fully crystallized following the solidification step. However, in some embodiments, the inorganic adhesive composition requires further heating to produce a crystallized inorganic adhesive composition.

In some embodiments, it is possible to control not only the amount of certain metal oxides present in the inorganic adhesive composition, such as the amount of Yttrium and Zirconia, but also to control the crystallinity of the inorganic adhesive composition through the composition of the inorganic adhesive composition precursor. For example, for Zirconia sol concentrations in the inorganic adhesive composition precursor having less than 1.3 M zirconia salt, the resultant adhesive may be quasi-amorphous. However, for Zirconia sol concentrations in the [organic] *inorganic* adhesive composition precursor having greater than 1.3 M zirconia salt, the resultant adhesives may be crystalline.

The inorganic adhesive composition may comprise one or more metal oxides as its majority component. For example, the *inorganic* adhesive composition may comprise at least about 50% by weight of metal oxide. In other embodiments, the *inorganic* adhesive *composition* may comprise at least about 60%, 70%, 80%, 90%, *or* 95% by weight of metal oxide. In one embodiment, the inorganic adhesive composition comprises 100% by weight of metal oxide. In another embodiment, the inorganic adhesive composition may comprise greater than 90% by weight of zirconia, or may even be 100% by weight of zirconia. In a further embodiment, the inorganic adhesive composition may comprise greater than 90% by weight of YSZ, or may even be 100% by weight of YSZ. Zirconia or YSZ inorganic adhesive compositions may be especially desirable when the material of the ferrule is zirconia or YSZ, respectively. As used herein, an inorganic adhesive composition comprising metal oxide may comprise one or more chemical species of metal oxide. The inorganic adhesive composition may comprise one or more metal oxides as its majority component. For example, the *inorganic* adhesive composition may comprise 50% by weight of a single chemical species of metal oxide. In other embodiments, the *inorganic* adhesive *composition* may comprise at least about 60%, 70%, 80%, 90%, *or* 95% by weight of a single chemical species of metal oxide. In one embodiment, the inorganic adhesive composition comprises 100% by weight of a single chemical species of metal oxide.

The inorganic adhesive compositions described herein may comprise one or more additional additives. The additives may enhance the adhesion and/or strength of the inorganic adhesive composition. Such additives may include, but are not limited to, nanostructures of graphene, carbon, silver, gold, platinum, or combinations thereof. For example, the nanostructures may be metallic nanoparticles (such as nanoparticles of gold, platinum, silver, aluminum, [cooper] *copper*, etc.), semiconductor nanoparticles (such as carbon nanotubes/nanodots, graphene, graphene oxide, CdS, CdTe). The additives can be doped into the inorganic adhesive composition precursor and are contained in the inorganic adhesive composition following curing. The additives may comprise between about 0% and about 50% by weight of the inorganic adhesive composition. For example, in some embodiments, the additives may [comprise] *be* less than or equal to about 40% by weight of the inorganic adhesive composition, less than or equal to about 30% by weight of the inorganic adhesive composition, less than or equal to about 20% by weight of the inorganic adhesive composition, less than or equal to about 10% by weight of the inorganic adhesive composition, or less than or equal to about 50% by weight of the inorganic adhesive composition.

In one embodiment, the inorganic adhesive composition may comprise an adhesion promoter. In one embodiment, the adhesion promoter may be incorporated into the inorganic adhesive composition precursor. In another embodiment, the fiber or ferrule, or both, may be coated with the adhesion promoter prior to the deposition of the inorganic adhesive composition precursor onto the optical fiber or into a fiber-receiving passage defining an inner surface of the ferrule. The adhesion promoter may enhance the interfacial bonding of the inorganic adhesive composition with the ferrule, fiber, or both. The adhesion promoter may include, without limitation, titanates (such as Tyzor 131 commercially available from DuPont), zirconates, (such as Tyzor 217 commercially available from DuPont), silanes (such as SIB 1824 and SIB 1821 commercially available from Gelest). The inorganic adhesive composition may comprise an amount of adhesion promoter of less than or equal to about 10% of the weight of the adhesion promoter, less than or equal to about 8% of the weight of the adhesion promoter, less than or equal to about 6% of the weight of the adhesion promoter, less than or equal to about 4% of the weight of the adhesion promoter, less than or equal to about 3% of the weight of the adhesion promoter, less than or equal to about 2% of the weight of the adhesion promoter, or even less than or equal to about 1% of the weight of the adhesion promoter.

It may be desirable, in some embodiments, to match the coefficient of thermal expansion (CTE) of the inorganic adhesive composition with the CTE of the ferrule and/or fiber. The inorganic adhesive compositions disclosed herein may have an advantage over other adhesives, such as polymer based adhesives, because the CTE of the inorganic [adhesives] *adhesive composition* disclosed herein may be more similar to the ferrule and/or the fiber. For example, an inorganic adhesive composition may have a CTE more similar to a ceramic ferrule and/or the glass of the fiber than an organic adhesive, such as a polymer.

In one embodiment, the inorganic adhesive composition may have a CTE in a range of between about 80% and 125% of the CTE of the ferrule over a temperature range from about −50° C. to about 80° C. In other embodiments, the inorganic adhesive composition may have a CTE in a range of between about 50% and 200%, 70% and 150%, or 90% and 110% of the CTE of the ferrule over a temperature range from about −50° C. to about 80° C. A non-inorganic adhesive composition, such as one comprising a polymer as a major constituent, may not have a CTE within these ranges.

In another embodiment, the inorganic adhesive composition is characterized by an adhesive CTE $\alpha 1$ that may vary by less than about $10\times10^{-6}$/K over a temperature range from about −50° C. to about 80° C. and the ferrule is characterized by *a* ferrule CTE α2 that may vary by less than about $10\times10^{-6}$/K over a temperature range from about −50° C. to about 80° C. In such an embodiment, the inorganic adhesive composition may be configured such that, over a temperature range from about −50° C. to about 80° C., $|\alpha1-\alpha2|\leq15\times10^{-6}$/K. In other embodiments, $|\alpha1-\alpha2|\leq40\times10^{-6}$/K, $30\times10^{-6}$/K, $20\times10^{-6}$/K, $12\times10^{-6}$/K, $10\times10^{-6}$/K, $8\times10^{-6}$/K, or even $5\times10^{-6}$/K. For example, glass may have a CTE of about $8.5\times10^{-6}$/K, YSZ may have a CTE of between about $6\times10^{-6}$/K and $12\times10^{-6}$/K at 25° C. and zirconia may have a CTE of about $10.3\times10^{-6}$/K at 25° C. However, for example, epoxy resins may have a CTE of about $55\times10^{-6}$/K at 25° C. As such, an epoxy, or other substance with a CTE much higher or lower than *the* fiber or ferrule may lack superior adhesion properties as compared with the inorganic adhesive compositions described herein. However, it should be understood that CTE matching, as described herein, is not a requirement of the connectors and adhesives.

Various embodiments will be further clarified by the following examples.

Example 1

The precursor solution of zirconium oxychloride octahydrate (Mol. Wt. 322.25 grams/mole) was prepared by dissolving the salt into DMF at a concentration of 1.3 molar. Care was taken to ensure that the salt [is] *was* completely dissolved via rapid continuous agitation and ultrasonic bath treatment. Specifically, 15.46 grams of zirconium oxychloride were dissolved into 23 ml of dimethylformamide to yield a final solution of about 30 ml. The precursor solution was clear, colorless and stable for several months. The solution could be adjusted to include salts of yttria and/or scandium chloride. A volume of about 10 microliters of the precursor solution was applied to the YSZ ferrule while threaded onto the receiving fiber. The ferrule was moved forward over the liquid to distribute the liquid throughout the fiber and ferrule interface. An 810 nm solid state IR laser was used as a heating source which when focused onto the ferrule solidified the liquid into solid inorganic interfacial bonding material between the spacing of the ferrule and fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the present disclosure. Since modifications combinations, sub-combinations and variations of the disclosed embodiments incorporating the spirit and substance of the disclosure may occur to persons skilled in the art, the present disclosure should be construed to include everything within the scope of the appended claims and their equivalents.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated herein.

It is noted that terms like "commonly" and "typically," when utilized herein, are not utilized to limit the scope of the claims or to imply that certain features are critical, essential, or even important to the structure or function of the claims. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that features and attributes associated with embodiments may be combined in different manners to result in other embodiments falling within the scope of the appended claims.

What is claimed is:

1. An optical connector comprising a ferrule, a waveguide, and an inorganic adhesive composition, wherein:

the ferrule comprises a fiber-receiving passage defining an inner surface;

the inorganic adhesive composition is disposed within the ferrule and in contact with the inner surface of the ferrule and the waveguide;

the inorganic adhesive composition comprises at least about 50% by weight of metal oxide; and the inorganic adhesive composition comprises yttria-stabilized zirconia.

2. The optical connector of claim 1, wherein the ferrule [is] *comprises* a ceramic material.

3. The optical connector of claim 1, wherein the inorganic adhesive composition [is] *comprises* substantially the same material as the ferrule.

4. The optical connector of claim 1, wherein the ferrule comprises zirconia or yttria-stabilized zirconia.

5. The optical connector of claim 1, wherein the inorganic adhesive composition further comprises one or more nanostructures of graphene, carbon, silver, gold, platinum, or combinations thereof.

6. The optical connector of claim 1, wherein the inorganic adhesive composition comprises at least about 50% *by weight of* yttria-stabilized zirconia.

7. The optical connector of claim 1, wherein:

the inorganic adhesive composition is characterized by an adhesive CTE α1 that varies by less than about 10×10-6/K over a temperature range from about −50° C. to about 80° C.;

the ferrule is characterized by a ferrule CTE α2 that varies by less than about 15×10-6/K over a temperature range from about −50° C. to about 80° C.; and the inorganic adhesive composition is configured such that, over a temperature range from about −50° C. to about 80° C., $|\alpha 1-\alpha 2| \leq 15\times 10\text{-}6/K$.

8. The optical connector of claim 1, wherein the waveguide comprises an optical fiber.

9. An optical connector comprising a ferrule, a waveguide, and an inorganic adhesive composition, wherein:

the ferrule comprises a fiber-receiving passage defining an inner surface;

the inorganic adhesive composition is disposed within the ferrule and in contact with the inner surface of the ferrule and the waveguide;

the inorganic adhesive composition comprises at least about 50% by weight of metal oxide *comprising zirconia or yttria-stabilized zirconia*; and the inorganic adhesive composition has a CTE in a range of between about 80% and 125% of the CTE of the ferrule over a temperature range from about −50° C. to about 80° C.

10. A method for securing a waveguide to a ferrule of an optical connector, the method comprising:

depositing an inorganic adhesive composition precursor onto the waveguide or into a fiber-receiving passage defining an inner surface of the ferrule;

inserting the waveguide into the fiber-receiving passage, such that the inorganic adhesive composition precursor is disposed within the ferrule and in contact with the inner surface of the ferrule; and solidifying the inorganic adhesive composition precursor to form an inorganic adhesive composition, wherein [and] the inorganic adhesive composition comprises at least about 50% by weight of metal oxide *comprising zirconia or ytrria-stabilized zirconia*, and wherein the solidification comprises exposing the inorganic adhesive composition precursor to a temperature in a range of from about 200° C. to about 1200° C.

11. The method of claim 10, wherein the inorganic adhesive composition comprises *at least about 50% by weight of* zirconia or yttria-stabilized zirconia.

12. The method of claim 10, wherein the inorganic adhesive composition precursor comprises a metallic salt, another metal ion containing compound, or combinations thereof in a solvent.

13. The method of claim 12, wherein the metallic salt and/or the other metal ion containing compound comprises ions of zinc, tin, aluminum, indium, iron, tungsten, titanium, zirconium, silicon, silicon nitride, boron, boron nitride, copper, silver, yttrium, rare earth ions, or combinations thereof.

14. The method of claim 12, wherein the metallic salt and/or the other metal ion containing compound comprises ions of zirconium, yttrium, or both.

15. The method of claim 12, wherein the solvent is a polar aprotic solvent.

16. The method of claim 12, wherein the inorganic adhesive composition precursor [is] *comprises* a sol-gel solution.

17. The method of claim 10, wherein the waveguide comprises an optical fiber.

18. A method for securing a waveguide to a ferrule of an optical connector, the method comprising:

depositing an inorganic adhesive composition precursor onto the waveguide or into a fiber-receiving passage defining an inner surface of the ferrule;

inserting the waveguide into the fiber-receiving passage, such that the inorganic adhesive composition precursor is disposed within the ferrule and in contact with the inner surface of the ferrule;

solidifying the inorganic adhesive composition precursor to form an inorganic adhesive composition, wherein [and] the inorganic adhesive composition comprises at least about 50% by weight of metal oxide; and crystallizing the inorganic adhesive composition after the solidification.

19. The method of claim 18, wherein the inorganic adhesive composition is crystallized by exposure to a temperature in a range of from about 200° C. to about 1200° C.

*20. An optical connector comprising at least one waveguide and an inorganic adhesive composition, wherein:*

*the inorganic adhesive composition bonds the at least one waveguide to a part of the optical connector;*

*the inorganic adhesive composition comprises at least about 50% by weight of metal oxide; and*

*the inorganic adhesive composition comprises yttria-stabilized zirconia.*

*21. The optical connector of claim 20, further comprising a ferrule that defines at least one longitudinal bore for receiving the at least one waveguide, wherein the part of the optical connector to which the at least one waveguide is bonded by the inorganic adhesive composition comprises the ferrule.*

*22. The optical connector of claim 21, wherein the at least one longitudinal bore defines at least one inner surface, and at least a portion of the inorganic adhesive composition is disposed within the ferrule and in contact with the at least one inner surface.*

*23. The optical connector of claim 21, wherein the ferrule comprises a ceramic material, and the inorganic adhesive composition comprises substantially the same material as the ferrule.*

*24. The optical connector of claim 21, wherein:*

*the inorganic adhesive composition is characterized by an adhesive coefficient of thermal expansion (CTE) $\alpha 1$ that varies by less than about $10\times 10^{-6}/K$ over a temperature range from about −50° C. to about 80° C.;*

*the ferrule is characterized by a ferrule CTE $\alpha 2$ that varies by less than about $15\times 10^{-6}/K$ over a temperature range from about −50° C. to about 80° C.; and*

*the inorganic adhesive composition is configured such that, over a temperature range from about −50° C. to about 80° C., $|\alpha 1-\alpha 2| \leq 15\times 10^{-6}/K$.*

*25. The optical connector of claim 20, further comprising a connector housing and a ferrule at least partially disposed within the connector housing, wherein the part of the optical connector to which the at least one waveguide is bonded by the inorganic adhesive composition is disposed within the connector housing.*

*26. The optical connector of claim 25, wherein the ferrule is biased forwardly relative to the connector housing.*

*27. The optical connector of claim 25, wherein at least a portion of the inorganic adhesive composition is arranged in contact with the ferrule.*

*28. The optical connector of claim 20, wherein the inorganic adhesive composition further comprises one or more nanostructures of graphene, carbon, silver, gold, platinum, or combinations thereof.*

*29. The optical connector of claim 20, wherein the inorganic adhesive composition comprises at least about 50% by weight of yttria-stabilized zirconia.*

*30. The optical connector of claim 20, wherein the at least one waveguide comprises at least one stub optical fiber.*

*31. The optical connector of claim 20, wherein the at least one waveguide comprises a plurality of optical fibers.*

*32. An optical connector comprising a ferrule, at least one waveguide, and an inorganic adhesive composition, wherein:*

*the ferrule comprises at least one fiber-receiving passage defining at least one inner surface;*

*the inorganic adhesive composition is disposed within the optical connector and in contact with the at least one waveguide;*

*the inorganic adhesive composition comprises at least about 50% by weight of metal oxide comprising zirconia or yttria-stabilized zirconia; and*

*the inorganic adhesive composition has a coefficient of thermal expansion (CTE) in a range of between about 80% and 125% of a CTE of the ferrule over a temperature range from about −50° C. to about 80° C.*

*33. The optical connector of claim 32, further comprising a connector housing, wherein at least a portion of the ferrule is arranged within the connector housing, and the ferrule is biased forwardly relative to the connector housing.*

*34. The optical connector of claim 33, wherein at least a portion of the inorganic adhesive composition is disposed within the ferrule and in contact with the at least one inner surface.*

*35. The optical connector of claim 32, wherein the at least one waveguide comprises at least one stub optical fiber.*

*36. A method for securing at least one waveguide to an optical connector, wherein the optical connector includes an inorganic adhesive composition precursor deposited into the optical connector, the method comprising:*

*inserting the at least one waveguide into the optical connector, such that the inorganic adhesive composition precursor is in contact with the at least one waveguide and with a part of the optical connector; and*

*solidifying the inorganic adhesive composition precursor to form an inorganic adhesive composition that bonds the at least one waveguide to the part of the optical connector, wherein the inorganic adhesive composition comprises at least about 50% by weight of metal oxide comprising zirconia or yttria-stabilized zirconia, and wherein the solidification comprises exposing the inorganic adhesive composition precursor to a temperature in a range of from about 200° C. to about 1200° C.*

*37. The method of claim 36, wherein the optical connector comprises a ferrule and a connector housing, at least a portion of the ferrule is arranged within the connector housing, and the ferrule is biased forwardly relative to the connector housing.*

*38. The method of claim 37, wherein at least a portion of the inorganic adhesive composition precursor is disposed within the ferrule.*

*39. The method of claim 37, further comprising depositing the inorganic adhesive composition precursor onto the at least one waveguide or into a fiber-receiving passage defining an inner surface of the ferrule.*

*40. The method of claim 36, wherein the exposing of the inorganic adhesive composition precursor to a temperature in the range of from about 200° C. to about 1200° C. comprises heating the inorganic adhesive composition precursor with a laser.*

*41. The method of claim 36, wherein the inorganic adhesive composition precursor comprises at least about 50% by weight of zirconia or yttria-stabilized zirconia.*

*42. The method of claim 36, wherein the inorganic adhesive composition precursor comprises a metallic salt, another metal ion containing compound, or combinations thereof in a solvent.*

*43. The method of claim 42, wherein the metallic salt and/or the other metal ion containing compound comprises ions of zinc, tin, aluminum, indium, iron, tungsten, titanium, zirconium, silicon, silicon nitride, boron, boron nitride, copper, silver, yttrium, rare earth ions, or combinations thereof.*

*44. The method of claim 42, wherein the metallic salt and/or the other metal ion containing compound comprises ions of zirconium, yttrium, or both.*

*45. The method of claim 42, wherein the solvent is a polar aprotic solvent.*

*46. The method of claim 42, wherein the inorganic adhesive composition precursor comprises a sol-gel solution.*

*47. The method of claim 36, wherein the at least one waveguide comprises at least one stub optical fiber.*

*48. A method for securing at least one waveguide to an optical connector, wherein the optical connector includes an inorganic adhesive composition precursor deposited into the optical connector, the method comprising:*

*inserting the at least one waveguide into the optical connector, such that the inorganic adhesive composition precursor is in contact with the at least one waveguide and with a part of the optical connector;*

*solidifying the inorganic adhesive composition precursor to form an inorganic adhesive composition that bonds the at least one waveguide to the part of the optical connector, wherein the inorganic adhesive composition comprises at least about 50% by weight of metal oxide; and*

*crystallizing the inorganic adhesive composition after the solidification.*

*49. The method of claim 48, wherein the inorganic adhesive composition is crystallized by exposure to a temperature in a range of from about 200° C. to about 1200° C.*

*50. The method of claim 48, wherein the optical connector comprises a ferrule and a connector housing, at least a portion of the ferrule is arranged within the connector housing, and the ferrule is biased forwardly relative to the connector housing.*

*51. The method of claim 50, wherein at least a portion of the inorganic adhesive composition precursor is disposed within the ferrule.*

*52. The method of claim 50, further comprising depositing the inorganic adhesive composition precursor onto the at least one waveguide or into a fiber-receiving passage defining an inner surface of the ferrule.*

*53. The method of claim 48, wherein the inorganic adhesive composition precursor comprises a sol-gel solution.*

* * * * *